(12) United States Patent
Dasgupta et al.

(10) Patent No.: US 10,902,311 B2
(45) Date of Patent: Jan. 26, 2021

(54) REGULARIZATION OF NEURAL NETWORKS

(71) Applicant: International Business Machines Corporation, Armonk, NY (US)

(72) Inventors: Sakyasingha Dasgupta, Tokyo (JP); Takayuki Osogami, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 15/392,041

(22) Filed: Dec. 28, 2016

(65) Prior Publication Data

US 2018/0075341 A1 Mar. 15, 2018

(30) Foreign Application Priority Data

Sep. 9, 2016 (JP) .................................. 2016-176336

(51) Int. Cl.
*G06N 3/04* (2006.01)
*G06N 3/08* (2006.01)

(52) U.S. Cl.
CPC ........... *G06N 3/0454* (2013.01); *G06N 3/049* (2013.01); *G06N 3/0445* (2013.01); *G06N 3/08* (2013.01); *G06N 3/088* (2013.01)

(58) Field of Classification Search
CPC .... G06N 3/0454; G06N 3/0445; G06N 3/049; G06N 3/08; G06N 3/088
See application file for complete search history.

(56) References Cited

U.S. PATENT DOCUMENTS 9,336,483 B1 * 5/2016 Abeysooriya ............ G06N 3/08
9,547,818 B2    1/2017 Osogami et al.
(Continued)

FOREIGN PATENT DOCUMENTS

JP    2013143031 A    7/2013
JP    2015011510 A    1/2015
(Continued)

OTHER PUBLICATIONS

Tomas Mikolov, Martin Karafat, Lukas Burget, Jan Honza Cernocky, Sanjeev Khudanpur, "Recurrent neural network based language model", Interspeech, Sep. 26-30, 2010, Makuhari, Chiba, Japan, pp. 1045-1048. (Year: 2010).*

(Continued)

*Primary Examiner* — Kakali Chaki
*Assistant Examiner* — Vasyl Dykyy
(74) *Attorney, Agent, or Firm* — Peter K. Suchecki

(57) ABSTRACT

Regularization of neural networks. Neural networks can be regularized by obtaining an original neural network having a plurality of first-in-first-out (FIFO) queues, each FIFO queue located between a pair of nodes among a plurality of nodes of the original neural network, generating at least one modified neural network, the modified neural network being equivalent to the original neural network with a modified length of at least one FIFO queue, evaluating each neural network among the original neural network and the at least one modified neural network, and determining which neural network among the original neural network and the at least one modified neural network is most accurate, based on the evaluation.

20 Claims, 7 Drawing Sheets

(56) References Cited

U.S. PATENT DOCUMENTS

| | | | |
|---|---|---|---|
| 2004/0002776 A1* | 1/2004 | Bickford | G05B 23/0254 700/30 |
| 2014/0180986 A1 | 6/2014 | Hinton et al. | |
| 2014/0344203 A1 | 11/2014 | Ahn | |
| 2015/0006444 A1 | 1/2015 | Tamatsu | |
| 2015/0106316 A1* | 4/2015 | Birdwell | G06F 16/22 706/33 |
| 2016/0092767 A1 | 3/2016 | Osogami et al. | |
| 2016/0350650 A1* | 12/2016 | Leeman-Munk | G06N 3/08 |
| 2016/0358068 A1* | 12/2016 | Brothers | G06N 3/0454 |

FOREIGN PATENT DOCUMENTS

| | | |
|---|---|---|
| JP | 2016071697 A | 5/2016 |
| JP | 5943358 B2 | 6/2016 |

OTHER PUBLICATIONS

Nitish Srivastava, Geoffrey Hinton, Alex Krizhevsky, Ilya Sutskever, Ruslan Salakhutdinov, "Dropout: A Simple Way to Prevent Neural Networks from Overfitting", Journal of Machine Learning Research 15, pp. 1930-1958, 2014 (Year: 2014).*

Osogami et al, "Learning Dynamic Boltzmann Machines with Spike-Timing Depedent Plasticity," Neural and Evolutionary Computing, Sep. 29, 2015.

Srivastava et al, "Dropout: A Simple Way to Prevent Neural Networks From Overfitting" Journal of Machine Learning Research 15 (2014), Jun. 6, 2014.

Mahdaviani et al, "A Method to Resolve the Overfitting Problem in Recurrent Neural Networks for Prediction of Complex System's Behavior," IEEE 2008 International Joint Conference on Neural Networks, 2008, pp. 3723-3728.

IBM, "IBM Research Blog | History of Progress, IBM Takes Its Quantum Computer to Japan to Launch Country-Wide Quantum Initiative," ibmresearchnews.blogspot.jp/2015/09/mimicking-neurons-with-math.html, printed Dec. 19 2019, 3 pgs.

IBM, "Researchers at IBM Tokyo Research Laboratories demonstrate how computers learn like living things," https://www-03.ibm.com/press/jp/ja/pressrelease/48420.wss, Sep. 16, 2015, printed Dec. 19, 2019, 1 pg.

Osogami et al., "Apparatus and Method for Learning a Model Corresponding to Time-Series Input Data," U.S. Appl. No. 14/852,943, filed Sep. 14, 2015.

Osogami et al., "Seven neurons memorizing sequences of alphabetical images via spike-timing dependent plasticity," https://www.nature.com/articles/srep14149, Scientific Reports, Sep. 16, 2015, 13 pgs.

* cited by examiner

REGULARIZATION OF NEURAL NETWORKS

CROSS-REFERENCE TO RELATED APPLICATION

This application claims the benefit of priority to Japanese Patent Application No. 2016-176336, filed Sep. 9, 2016, the contents of which are incorporated herein by reference.

BACKGROUND

The present invention relates to regularization of neural networks. More specifically, the present invention relates to regularization of neural networks having first-in-first-out (FIFO) queues.

Deep neural networks have been successfully applied for learning in a large number of image recognition and other machine learning tasks. However, neural network based models are typically well suited for scenarios with large amounts of available labelled datasets. By increasing the complexity of the neural network in terms of size or number of layers, one can achieve impressive levels of performance. A caveat is that this can lead to gross over-fitting or generalization issues, when trained in the presence of limited amounts of training samples. As a result, a wide range of techniques, like adding an l2 penalty term, Bayesian methods, adding noise to training data, etc., for regularizing neural networks have been developed.

More recently, with a focus on neural networks with a deep architecture, Dropout techniques, such as disclosed in N. Srivastava, G. Hinton, A. Krizhevsky, I. Sutskever, and R. Salakhutdinov, "Dropout: A simple way to prevent neural networks from overfitting," The Journal of Machine Learning Research, vol. 15, no. 1, pp. 1929-1958, 2014, and DropConnect techniques, such as disclosed in L. Wan, M. Zeiler, S. Zhang, Y. L. Cun, and R. Fergus, "Regularization of neural networks using dropconnect," in Proceedings of the $30^{th}$ International Conference on Machine Learning (ICML-13), 2013, pp. 1058-1066, have been proposed as ways to prevent over-fitting by randomly omitting some of the feature detectors on each training sample. Specifically, Dropout involves randomly deleting half the activations (or units) in each layer during a forward pass and then back-propagating the error only through the remaining units. DropConnect generalizes this to randomly omitting weights rather than the activations (units). Both these techniques have been shown to significantly improve the performance of standard fully-connected deep neural network architectures.

Recently, a generative model called dynamic Boltzmann machine (DyBM) was introduced, JP Patent No. 5943358, filed on Sep. 30, 2014. Unlike the conventional Boltzmann machine, which is trained with a collection of static patterns, DyBM is designed for unsupervised learning of temporal pattern sequences. DyBM is motivated by postulates and observations, from biological neural networks, allowing exact inference and learning of weights based on the timing of spikes (spiketiming dependent plasticity—STDP). Unlike the restricted Boltzmann machine (RBM), DyBM generally has no specific hidden units, and it's network can be unfolded through time, allowing for infinitely many layers. In certain circumstances DyBM can have hidden units, such as layers of hidden units that each correspond to a layer that processes temporal pattern sequences. Furthermore, DyBM can be viewed as a fully-connected recurrent neural network with memory units and with conduction delays between units implemented in the form of fixed-length first-in first-out (FIFO) queues. A spike originating at a pre-synaptic neuron travels along this FIFO queue and reaches the post-synaptic neuron after a fixed delay. The length of the FIFO queues is equal to one minus the maximum delay value. Due to this completely novel architecture of DyBM, applying existing regularization methods is difficult or does not lead to better generalization performance.

SUMMARY

According to one aspect of the present invention, provided is a computer-implemented method including obtaining an original neural network having a plurality of first-in-first-out (FIFO) queues, each FIFO queue located between a pair of nodes (also referred to herein as neurons or units) among a plurality of nodes of the original neural network, generating at least one modified neural network, the modified neural network being equivalent to the original neural network with a modified length of at least one FIFO queue, evaluating each neural network among the original neural network and the at least one modified neural network, and determining which neural network among the original neural network and the at least one modified neural network is most accurate, based on the evaluation.

According to another aspect of the present invention there is provided a non-transitory readable storage medium tangibly embodying a computer readable program code having computer readable instructions which, when implemented, cause a computer device to carry out the steps of a method including obtaining an original neural network having a plurality of first-in-first-out (FIFO) queues, each FIFO queue located between a pair of nodes among a plurality of nodes of the original neural network, generating at least one modified neural network, the modified neural network being equivalent to the original neural network with a modified length of at least one FIFO queue, evaluating each neural network among the original neural network and the at least one modified neural network, and determining which neural network among the original neural network and the at least one modified neural network is most accurate, based on the evaluation.

According to yet another aspect of the present invention, there is provided an apparatus including an obtaining section operable to obtain an original neural network having a plurality of first-in-first-out (FIFO) queues, each FIFO queue located between a pair of nodes among a plurality of nodes of the original neural network, a generating section operable to generate at least one modified neural network, the modified neural network being equivalent to an original neural network with a modified length of at least one FIFO queue, an evaluating section operable to evaluate each neural network among the original neural network and the at least one modified neural network, and a determining section operable to determine which neural network among the original neural network and the at least one modified neural network is most accurate, based on the evaluation.

DETAILED DESCRIPTION

Hereinafter, example embodiments of the present invention will be described. The example embodiments shall not limit the invention according to the claims, and the combinations of the features described in the embodiments are not necessarily essential to the invention.

Embodiments of the present invention can allow regularized training of neural networks, such as neural networks with FIFO queues. In some embodiments, during training, the lengths of random FIFO queues are truncated to zero.

Figure 1:
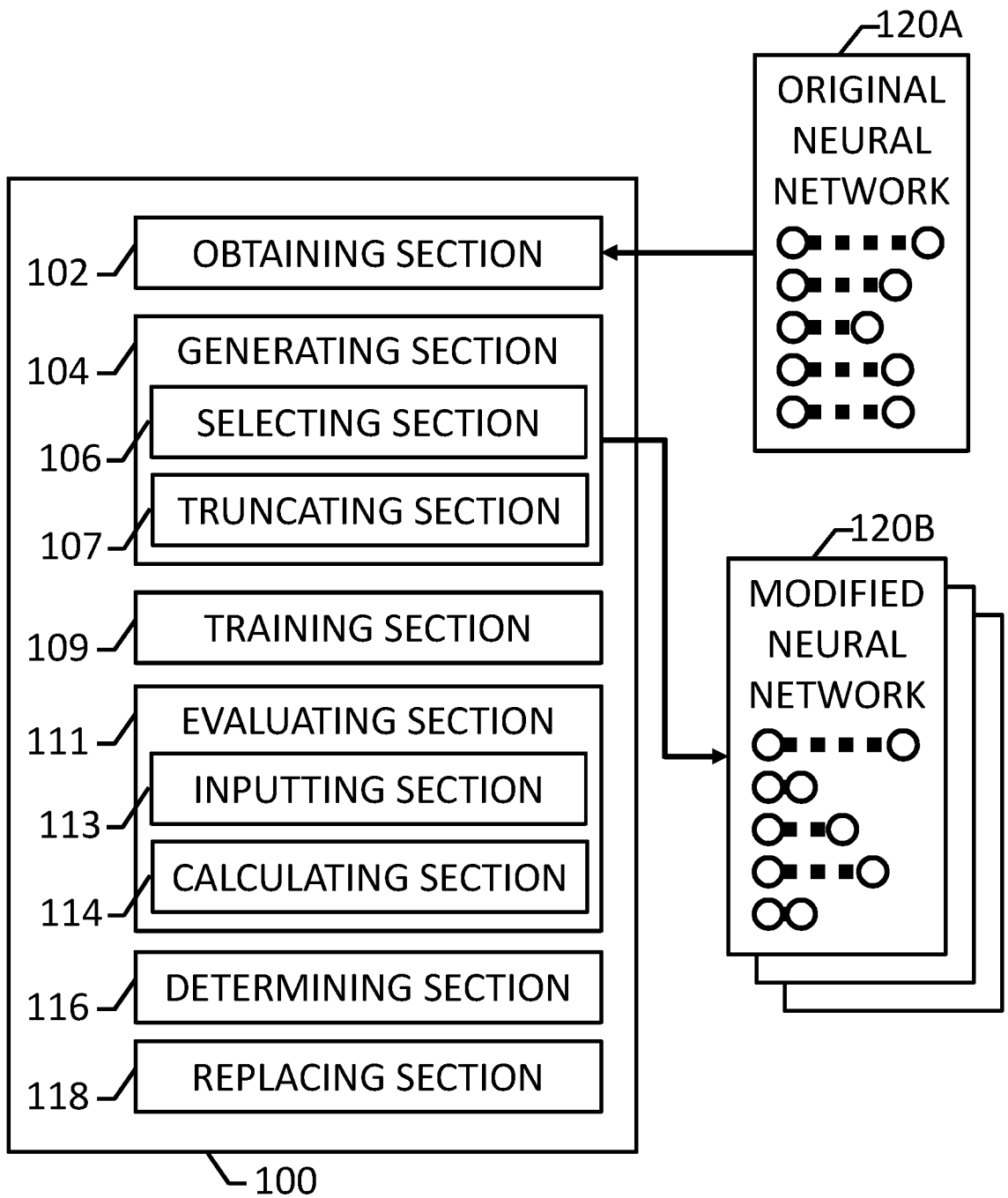
FIG. 1 shows an apparatus for neural network regularization, according to an embodiment of the present invention.

FIG. 1 shows an apparatus 100 for neural network regularization, according to an embodiment of the present invention. Apparatus 100 can be a host computer such as a server computer or a mainframe computer that executes an on-premise application and hosts client computers that use it. Apparatus 100 can be a computer system that includes two or more computers. Alternatively, apparatus 100 can be a personal computer that executes an application for a user of apparatus 100. Apparatus 100 can regularize a neural network by generating modified neural networks, and evaluating the neural networks to determine the most accurate neural network among the original and modified neural networks.

Apparatus 100 can include an obtaining section 102, a generating section 104, which can include a selecting section 106 and a truncating section 107, a training section 109, an evaluating section 111, which can include an inputting section 113 and a calculating section 114, a determining section 116, and a replacing section 118. Apparatus 100 can be a computer program product comprising a computer readable storage medium having program instructions embodied therewith, the program instructions executable by a computer to cause the computer to perform the operations of the various sections. Apparatus 100 can alternatively be analog or digital programmable circuitry, or any combination thereof. Apparatus 100 can be composed of physically separated storage or circuitry that interacts through communication.

Obtaining section 102 can receive data from data stores in communication with apparatus 100. For example, obtaining section 102 can be operable to obtain an original neural network having a plurality of first-in-first-out (FIFO) queues, each FIFO queue located between a pair of nodes among a plurality of nodes of the original neural network, such as original network 120A. Obtaining section 102 can communicate directly with such data stores, or can utilize a transceiver to communicate with a computer through wired or wireless communication across a network.

Generating section 104 can generate modified neural networks from an original neural network. For example, generating section 104 can be operable to generate at least one modified neural network, the modified neural network being equivalent to an original neural network with a modified length of at least one FIFO queue, such as modified neural network 120B. In such examples, selecting section 106 can select the at least one FIFO queue to modify, and truncating section 107 can truncate the FIFO queue to a designated length.

Training section 109 can train neural networks using training samples to adjust or assist in the adjustment of weights of the neural networks.

Evaluating section 111 can be operable to evaluate each neural network among the original neural network and the at least one modified neural network. For example, evaluating section 111 can assign a value to each neural network based on the evaluation to compare with values assigned to other neural networks. Inputting section 113 can input a test data set into each neural network, and calculating section 114 can calculate the value to be assigned based on the actual output of neural network compared to the expected or ideal output.

Determining section 116 can be operable to determine which neural network among the original neural network and the at least one modified neural network is most accurate, based on the evaluation. For example, determining section 116 can determine which neural network among the original and modified neural networks has the highest assigned value.

Replacing section 118 can replace the original neural network with a modified neural network in response to a determination that a modified neural network is more accurate than the original neural network. For example, replacing section 118 can update a pointer to point to the modified neural network instead of the original neural network. Once the original neural network has been replaced by a modified neural network, the modified neural network can be replaced by a further modified neural network, such as a neural network that has a modified length of at least one more FIFO queue.

An apparatus, such as apparatus 100, can be useful for DyBM. Apparatus 100 can also be used for any neural network model having a FIFO queue between nodes for propagating data from an originating node to a destination node. DyBM can be used for unsupervised learning of temporal sequences, and can show better generalized performance when subjected to the apparatus. Unlike standard Boltzmann machines, DyBM can be trained with a time-series of patterns. Specifically, the DyBM gives the conditional probability of the next values (patterns) of a time-series given its historical values. This conditional probability can depend on the whole history of the time-series, and the DyBM can thus be used iteratively as a generative model of a time-series. DyBM can also be used for estimating a conditional probability of occurrence of a timeseries of patterns given after being trained by using at least one training data sequence.

DyBM can be defined from BM having multiple layers of units, where one layer represents the most recent values of a time-series, and the remaining layers represent the historical values of the time-series. The most recent values are conditionally independent of each other given the historical values. A DyBM can be equivalent to such a BM having an infinite number of layers, so that the most recent values can depend on the whole history of the time series. A DyBM can be trained in such a way that the likelihood of a given time-series is maximized with respect to the conditional distribution of the next values given the historical values. Similar to a BM, a DyBM can consist of a network of artificial neurons. Each neuron can take a binary value, 0 or 1, following a probability distribution that depends on the parameters of the DyBM. Unlike the BM, the values of the DyBM can change over time in a way that depends on its previous values. That is, the DyBM can stochastically generate a multi-dimensional series of binary values. A DyBM can have hidden nodes, such as layers of hidden nodes that each correspond to a layer that processes temporal pattern sequences. The hidden nodes are also connected to other nodes through FIFO queues. Each hidden layer can include at least one hidden node. Each node in the input layer can store the time-series input data. However, each hidden node in the hidden layer can store the sampled value. By using input from hidden nodes in addition to the time-series input data, the expressive ability and learning ability can be improved. In such DyBMs, any FIFO queues between one or two hidden nodes can also be subject to truncation through the process of regularizing.

Learning in conventional BMs can be based on a Hebbian formulation, but is often approximated with sampling based strategy like contrastive divergence. In this formulation the concept of time is largely missing. In DyBM, like biological networks, learning can be dependent on the timing of spikes. This is called spike-timing dependent plasticity, or STDP, which states that a synapse is strengthened if the spike of a presynaptic neuron precedes the spike of a post-synaptic neuron (long term potentiation—LTP), and the synapse is weakened if the temporal order is reversed (long term depression—LTD). DyBM can use an exact online learning rule that has the properties of LTP and LTD.

Figure 2:
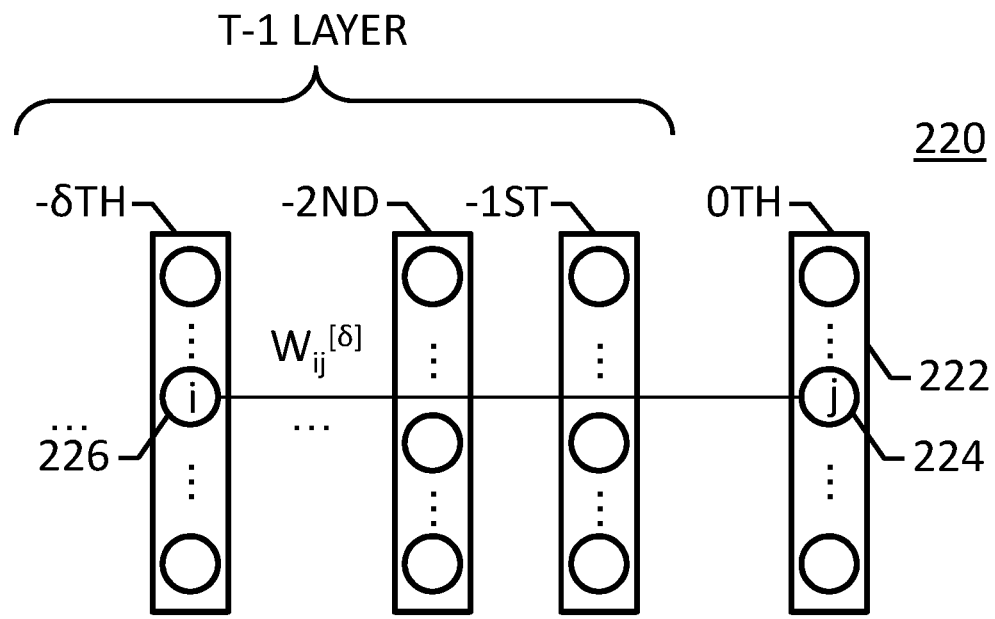
FIG. 2 shows a dynamic Boltzmann machine (DyBM) as an example of a neural network, according to an embodiment of the present invention.

FIG. 2 shows a dynamic Boltzmann machine (DyBM) 220 as an example of a neural network, such as original neural network 120A, according to an embodiment of the present invention. DyBM 220 can include a plurality of layers of nodes among the plurality of nodes, each layer sequentially forwarding input values of a time frame of a data set to a subsequent layer among the plurality of layers, the data set being a time series, the plurality of layers of nodes including a first layer 222 of input nodes, such as input node 224 among the plurality of nodes, the input nodes receiving input values of a current time frame of the data set, and a plurality of intermediate layers, each node in each intermediate layer forwarding a value from a previous layer to a node in a subsequent or shared layer, and a plurality of weight values corresponding to each FIFO queue, each weight value to be applied to each value in the corresponding FIFO queue to obtain a value propagating from a pre-synaptic node to a post-synaptic node.

DyBM 220 can be equivalent to a BM having infinitely many layers of units. DyBM has no weight between the neurons in the layer. Each layer of DyBM 220 has a common number of neurons, and the bias and the weight in DyBM 220 can be shared among different neurons in a particular manner.

Formally, DyBM 220 can be a BM having T layers from $-T+1$ to 0, where T is a positive integer or infinity. Let $x \equiv (x^{[t]}) - T < t \leq 0$, where $x^{[t]}$ is the values of the neurons in the t-th layer, which can be considered the values at time t. The N units at the $0^{TH}$ layer can have an associate bias term b. For any $\delta \geq 1$, $W^{[\delta]}$ gives the matrix whose (i,j) element, $W_{i,j}^{[\delta]}$, denotes the weight between the i-th unit at time $-\delta$ and the j-th unit at time 0 for any $\delta$. This weight can in turn be divided into LTP and LTD components. Each neuron can store a fixed number, L, of neural eligibility traces. For $l \in [1,$ L] and $j \in [1, N]$, $\gamma_{j,l}^{[t-1]}$ is the l-th neural eligibility trace of the j-th neuron immediately before time t. This can be calculated as a weighted sum of the past values of that neuron, with recent values weighing more, according to Equation 1:

$$\gamma_{j,l}^{[t-1]} = \Sigma_{s=-\infty}^{t-1} \mu_l^{t-s} x_j^{[s]}, \qquad \text{<Equation 1>}$$

where, $\mu_l \in (0,1)$ is the decay rate for the l-th neural eligibility trace. Each neuron can also store synaptic eligibility traces as a weighted sum of the values that has reached neuron, j, from a pre-synaptic neuron, i, after the conduction delay, $d_{i,j}$, with recent values weighing more. Namely, the postsynaptic neuron j can store a fixed number, K, of synaptic eligibility traces. For $k \in [1, K]$, $\alpha_{i,j,k}^{[t-1]}$ can be the k-th synaptic eligibility trace of the neuron j for the pre-synaptic neuron i immediately before time t, according to Equation 2:

$$\alpha_{i,j,k}^{[t-1]} = \Sigma_{s=-\infty}^{t-d_{i,j}} \lambda_k^{t-s-d_{i,j}} x_i^{[s]}, \qquad \text{<Equation 2>}$$

where, $\lambda_k \in (0,1)$ is the decay rate for the k-th synaptic eligibility traces. Both the eligibility traces are updated locally in time as follows, according to Equation 3 and Equation 4:

$$\gamma_{j,l}^{[t]} \leftarrow \mu_l(\gamma_{j,l}^{[t-1]} + x_j^{[t]}), < \qquad \text{Equation 3>}$$

$$\alpha_{i,j,k}^{[t]} \leftarrow \lambda_k(\alpha_{i,j,k}^{[t-1]} + x_i^{t-d_{i,j}}), < \qquad \text{Equation 4>}$$

for $l \in [1, L]$ and $k \in [1, K]$, and for neurons i that are connected to j. For DyBM 220, $P_\theta(x^{[0]}|x^{(-T,-1]})$ can be the conditional probability of $x^{(0)}$ given $x^{(-T,-1]}$, where we use $x^I$ for an interval I such as $(-T,-1]$ to denote $(x^{[t]})_{t \in I}$. Because the neurons in the $0^{TH}$ layer have no weight with each other, this conditional probability can have the property of conditional independence analogous to restricted Boltzmann machines.

DyBM 220 can be seen as a model of a time-series in the following sense. Specifically, given a history $x^{(-T,-1]}$ of a time-series, DyBM 220 can give the probability of the next values, $x^{[0]}$ of the time-series with $P_\theta(x^{[0]}|x^{(-T,-1]})$. With a DyBM of infinite layers, the next values can depend on the whole history of the time-series. In principle, a DyBM of infinite layers can model any time-series with long-term dependency, as long as the values of the time-series at a moment is conditionally independent of each other given its values preceding that moment. Using the conditional probability given by DyBM 220, the probability of a sequence, $x = x^{(-L,0]}$, of length L is given by Equation 5:

$$p(x) = \Pi_{t=-L+1}^{0} P_\theta(x^{[t]}|x^{(-T,t-1]}), \qquad \text{<Equation 5>}$$

where we arbitrarily define $x^{[t]} \equiv 0$ for $t \leq -L$. Namely, the values can be set to zero if there is no corresponding history.

The STDP based learning rule for DyBM 220 can be derived such that the log-likelihood of a given set (D) of a time-series is maximized by maximizing the sum of the log-likelihood of $x \in D$. Using Equation 5, the log-likelihood of $x = x^{(-L,0]}$ can have the following gradient according to Equation 6:

$$\nabla_\theta \log p(x) = \Sigma_{t=-L+1}^{0} \nabla_\theta \log P_\theta(x^{[t]}|x^{(-T,t-1]}), \qquad \text{<Equation 6>}$$

Typically, the computation of this gradient can be intractable for large T. However, in DyBM 220 using a specific form of weight sharing, exact and efficient gradient calculation can be possible. Specifically, in the limit of $T \to \infty$ using the formulation of neural and synaptic eligibility traces, the parameters of DyBM 220 can be computed exactly using an online stochastic gradient rule that maximizes the log-likelihood of the given set D according to Equation 7:

$$\theta \leftarrow \theta + \eta \cdot \Sigma_{x \in D} \nabla_\theta \log P_\theta(x^{[0]}|x^{(-\infty,-1]}), \qquad \text{<Equation 7>}$$

Figure 3:
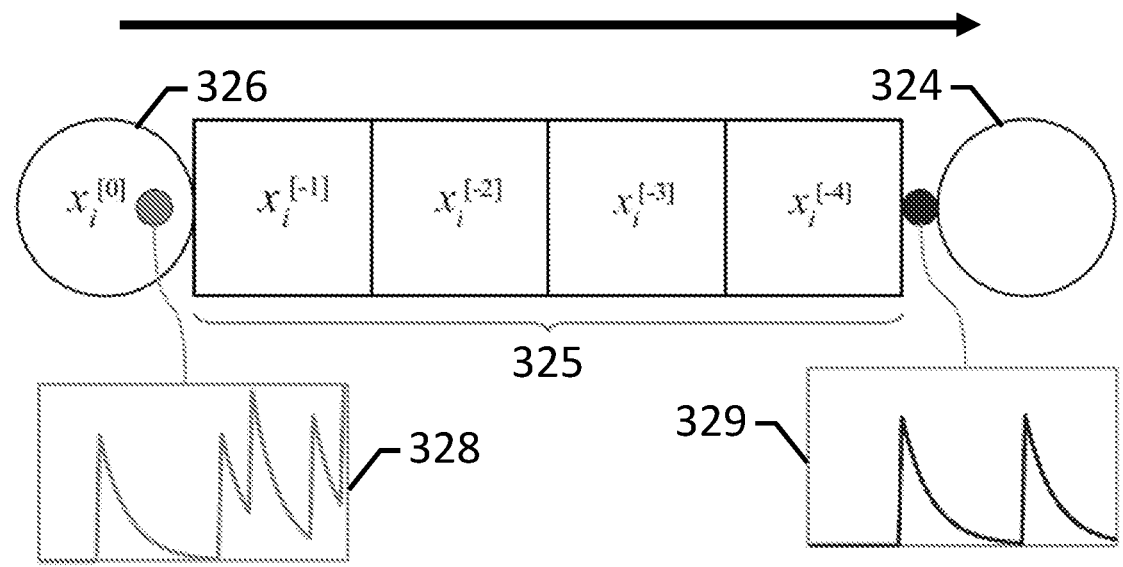
FIG. 3 shows a connection between a presynaptic neuron and a post-synaptic neuron via a FIFO queue, according to an embodiment of the present invention.

FIG. 3 shows a connection between a presynaptic neuron 326, which has a neural eligibility trace 328, and a post-synaptic neuron 324 via a FIFO queue 325, which has a synaptic eligibility trace 329, according to an embodiment of the present invention.

The learning rule of DyBM exhibits some of the key properties of STDP due to its structure consisting of conduction delays, such as pre-synaptic neuron 326, and memory units, such as FIFO queue 325. A neuron can be connected to another in a way that a spike from pre-synaptic neuron 326, i, travels along an axon and reaches post-synaptic neuron 324, j, via a synapse after a delay consisting of a constant period, $d_{i,j}$. FIFO queue 325 causes this conduction delay. FIFO queue 325 can store the values of pre-synaptic neuron 326 for the last $d_{i,j}-1$ units of time. Each stored value can be pushed one position toward the head of the queue when the time is incremented by one unit. The value of pre-synaptic neuron 326 is thus given to post-synaptic neuron 324 after the conduction delay. Moreover, the DyBM aggregates information about the spikes in the past into neural eligibility trace 328 and synaptic eligibility trace 329, which are stored in the memory units. Each neuron is associated with a learnable parameter called bias. The strength of the synapse between pre-synaptic neuron 326 and post-synaptic neuron 324 is represented by learnable parameters called weights, which can be further divided into LTP and LTD components.

Figure 4:
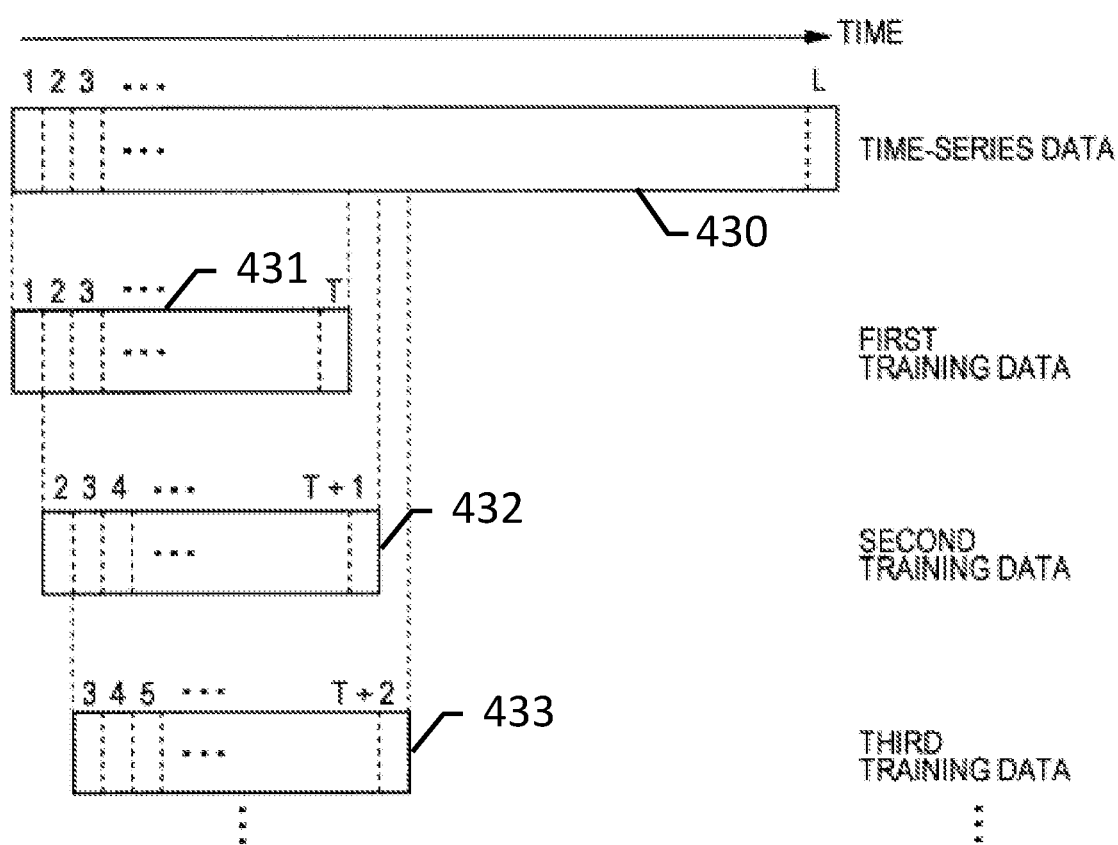
FIG. 4 shows an example of a time-series data set and training data, according to an embodiment of the present invention.

FIG. 4 shows an example of a time-series data set 430 and training data 431-433, according to an embodiment of the present invention. In FIG. 4, the horizontal axis denotes time. FIG. 4 illustrates an example case where a training section, such as training section 109, uses time-series data having a duration L that is longer than a duration of time-series data used as training data by the neural network during training.

The training section can perform a first training phase using, as first training data, a time-series data segment of the time-series data from a time point 1 to a time point T. Specifically, the training section can perform a first training phase using data at a time point T as each input value $x_j^{[0]}$ at the one time point and using the time-series data from the time point 1 to a time point T−1 as the input data sequence $x^{(-T,-1]}$ (i.e., a history).

Then, the training section can perform a second training phase using, as second training data, a time-series data segment of the time-series data from a time point 2 to a time point T+1. The training section can sequentially use each of D data items up to a time point T+D−1 as the input value $x_j^{[0]}$ at each time point. In this case, the training section can use each of D time-series data segments from the time point D to the time point T+D−2 as the history by shifting the interval by one time point from the interval from the time point 1 to the time point T−1. The training section can adjust the parameters D times for the D input values $x_j^{[0]}$ and the corresponding D histories in this manner. That is, the training section can use stochastic gradient descent in which learning can be performed for t ranging from 0 to D−1.

Alternatively, the training section can acquire D time-series data sets, generate a plurality of training data sets from time-sequence data segments of a duration of L, and collectively perform learning for D layers.

Figure 5:
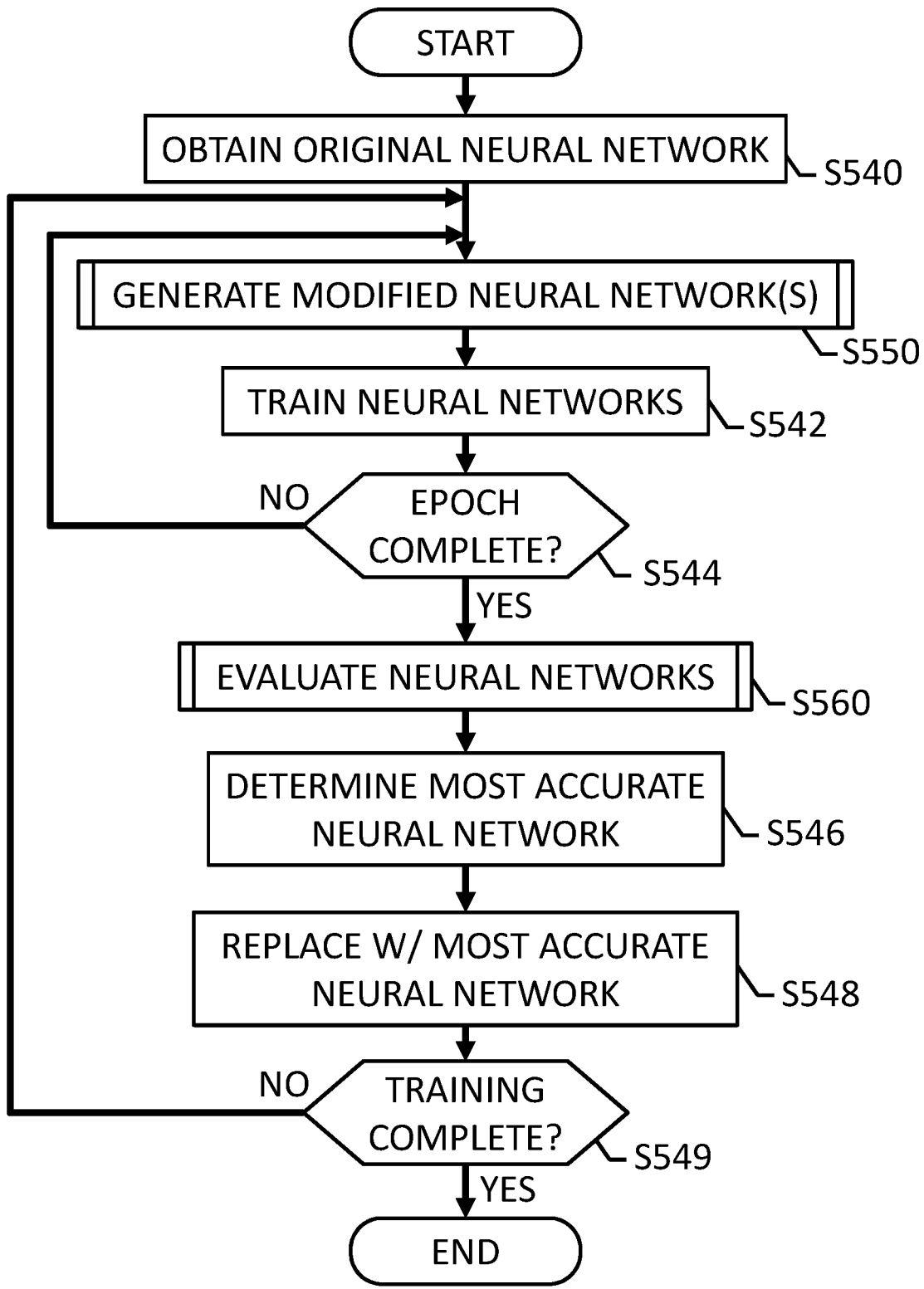
FIG. 5 shows an operational flow for regularizing a neural network, according to an embodiment of the present invention.

FIG. 5 shows an operational flow for regularizing a neural network, according to an embodiment of the present invention. The operational flow can provide a method of training a neural network, such as a DyBM, a general neural network with FIFO queues, etc., with regularization, and then choosing the best performing model for improved prediction on a test dataset. The operations can be performed by an apparatus, such as apparatus 100.

At S540, an obtaining section, such as obtaining section 102, can obtain an original neural network, such as original neural network 120A. For example, the obtaining section can obtain an original neural network having a plurality of first-in-first-out (FIFO) queues, each FIFO queue located between a pair of nodes among a plurality of nodes of the original neural network. In some embodiments in which the original neural network is a DyBM, operation S540 can include initializing DyBM parameters, with a delay length for the FIFO queues connecting neurons selected randomly within a certain range. Each neuron is connected to another neuron with two FIFO queues, one outgoing FIFO queue, and one incoming FIFO queue. The delay lengths or depths of the FIFO queues of the original neural network can be same or different sizes, and can be predetermined or random sizes. The original neural network can also be a neural network which is selected among a plurality of neural networks, such as a plurality of neural networks generated by the method shown in FIG. 5.

At S550, a generating section, such as generating section S550, can generate at least one modified neural network, such as modified neural network 120B. For example, the generating section can generate at least one modified neural network, the modified neural network being equivalent to the original neural network with a modified length of at least one FIFO queue.

At S542, a training section, such as training section 109, can train each neural network among the original neural network and the at least one modified neural network. Both operations S550 and S542 can occur once per training phase, wherein the training includes a training phase for each sample of a data set. This can be useful when the original neural network is a DyBM, wherein the data set is a time series, and each training phase corresponds to at least one time frame in the time series. During each training phase, a modified neural network is generated, and each neural network is trained with a training sample. In other words, the generating includes generating a modified neural network among the at least one modified neural network during each training phase. Eventually, the neural networks will be evaluated to determine the most accurate neural network. However, the evaluating and the determining can be performed after a threshold amount of training phases, known as a training cycle or epoch.

At S544, the training section can determine whether the epoch is complete. For example, if the epoch is 100 phases, then the training section can determine whether 100 phases of training have been performed since the beginning or since completion of the previous training cycle. The length of the epoch can be determined based on the number of training phases generally required to allow the weights to settle. The length of the epoch can be fixed based on an average, or can vary based on the volatility of the weights. If the epoch is not complete, then the process returns to operation S550 to generate another modified neural network, and then to S542, where the neural networks are trained with the next training sample. If the epoch is complete, then the process proceeds to S560. More than one modified neural network can be generated during each training phase, which can increase the likelihood of generating a more accurate neural network for each epoch, but can require more computational resources and/or require more time.

At S560, an evaluating section, such as evaluating section 111, can evaluate each neural network among the original neural network and the at least one modified neural network.

At S546, a determining section, such as determining section 116, can determine which neural network among the original neural network and the at least one modified neural network is most accurate, based on the evaluation.

At S548, a replacing section, such as replacing section 118, can replace the original neural network with the most accurate neural network. For example, the replacing section can update a pointer to identify the position of the most accurate neural network. Operations S560, S546, and S548 can be repeated at every epoch until all of the training cycles are exhausted.

Therefore, at S549, the training section determines whether all of the training cycles are complete. If the training cycles are not complete, then the process returns to S550 where another modified neural network is generated, and another epoch begins. However, if at S548 the original neural network was replaced with a modified neural network, then the training cycle will use the modified neural network instead of the original neural network. In other words, once the original neural network has been replaced with the most accurate neural network, subsequent generating, evaluating, and determining operations are performed with respect to the most accurate neural network instead of the original neural network. Occasionally, the most accurate neural network will still be the original neural network, or the same neural network that was found to be the most accurate during the previous training cycle. In those cases, at S548 no replacement or pointer update can actually take place.

By applying this operational flow, the best performing regularized neural network can be acquired. In this embodiment, the best performing neural network can consist substantially of all FIFO queues that survived the truncating procedure. For each training cycle, a new most accurate neural network can be sampled and trained. As a result of this procedure, the apparatus can train across an ensemble of neural networks and can effectively regularize the original neural network to prevent over-fitting. In other embodiments, the replacing section can average the neural networks across the ensemble, instead of selecting the best performing model.

Figure 6:
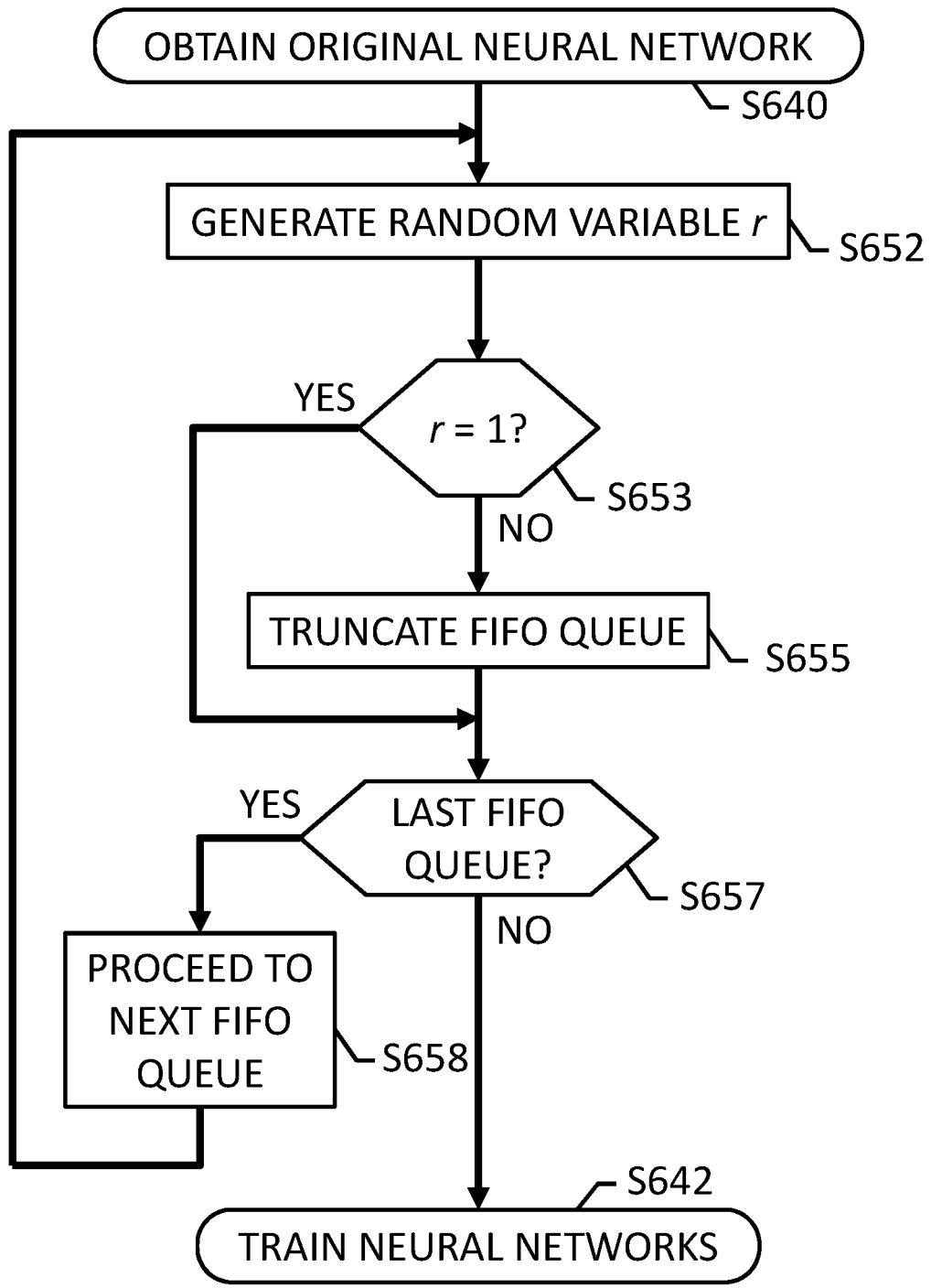
FIG. 6 shows an operational flow for generating modified neural networks, according to an embodiment of the present invention.

FIG. 6 shows an operational flow for generating modified neural networks, according to an embodiment of the present invention. This operational flow can provide a method for truncating the FIFO queue lengths to a designated length, by setting their respective delay values to the designated length, for randomly selected FIFO queues with a probability p. The operations can be performed by a generating section, such as generating section 104.

The operational flow begins at S640 as an original neural network is obtained.

At S652, a random variable r having a probability p can be generated by the generating section.

At S653, a selecting section, such as selecting section 106, determines whether to select a given FIFO queue. In other words, the generating includes selecting at least one FIFO queue among the plurality of FIFO queues in the original neural network to modify. For example, the selecting section can select a random variable r Bernoulli(p) from a Bernoulli distribution with probability p. If r=1, then the process skips step 655, and the original maximum delay (FIFO Queue length) is maintained. Otherwise, if r is equal to anything else, then the process proceeds to S655. In other words, the selecting is based on a random variable. In many embodiments p can be set to 0.5 so that each FIFO queue has a 50% chance of being truncated, but other values of p are possible. Many other methods of randomly selecting FIFO queues to truncate can be used instead.

At S655, a truncating section, such as truncating section 107, can truncate the FIFO queue. In other words, wherein the generating further includes truncating the at least one FIFO queue to a designated length. For example, the truncating section can truncate the FIFO queue length to zero. If the FIFO queue length is zero, the eligibility traces can be calculated based on the current value of the presynaptic neuron (or originating node) but without the previous values of it. In another example, the truncating section can decrease the FIFO queue length by subtracting a predetermined size (e.g. 1) from the length of the FIFO queue unless the length of the FIFO queue becomes smaller than a minimum size (e.g. 0 or 1). In yet another example, the truncating section can randomly generate the new length of the FIFO queue. In other embodiments, the apparatus can change the length of the FIFO queue by not only decreasing the length but also by increasing the length.

At S657, the generating section determines whether all FIFO queues have been subject to selection. If the last FIFO queue has not been subject to selection, then the operational flow proceeds to S658 where the generating section proceeds to consider the next FIFO queue in the neural network by returning to S652. If the last FIFO queue has been subject to selection, then the operational flow proceeds to S642 to train the neural networks.

In some embodiments, the truncating section can truncate selected FIFO queues to other fixed amounts, or by a variable amount. In other embodiments, the value of p can vary by the training phase, by the training cycle, etc. In embodiments where multiple modified neural networks are generated each training phase, each modified neural network generated in a given phase can be generated using a different value of p. Since there is technically a finite number of possible variations of an original neural network according to the method of generating modified neural networks, certain embodiments calculate each possibility and generate all possible modified neural networks for each training phase or training cycle given enough computational resources and/or time. Alternative embodiments can generate a fraction of evenly distributed possible modified networks for each training phase or training cycle.

Figure 7:
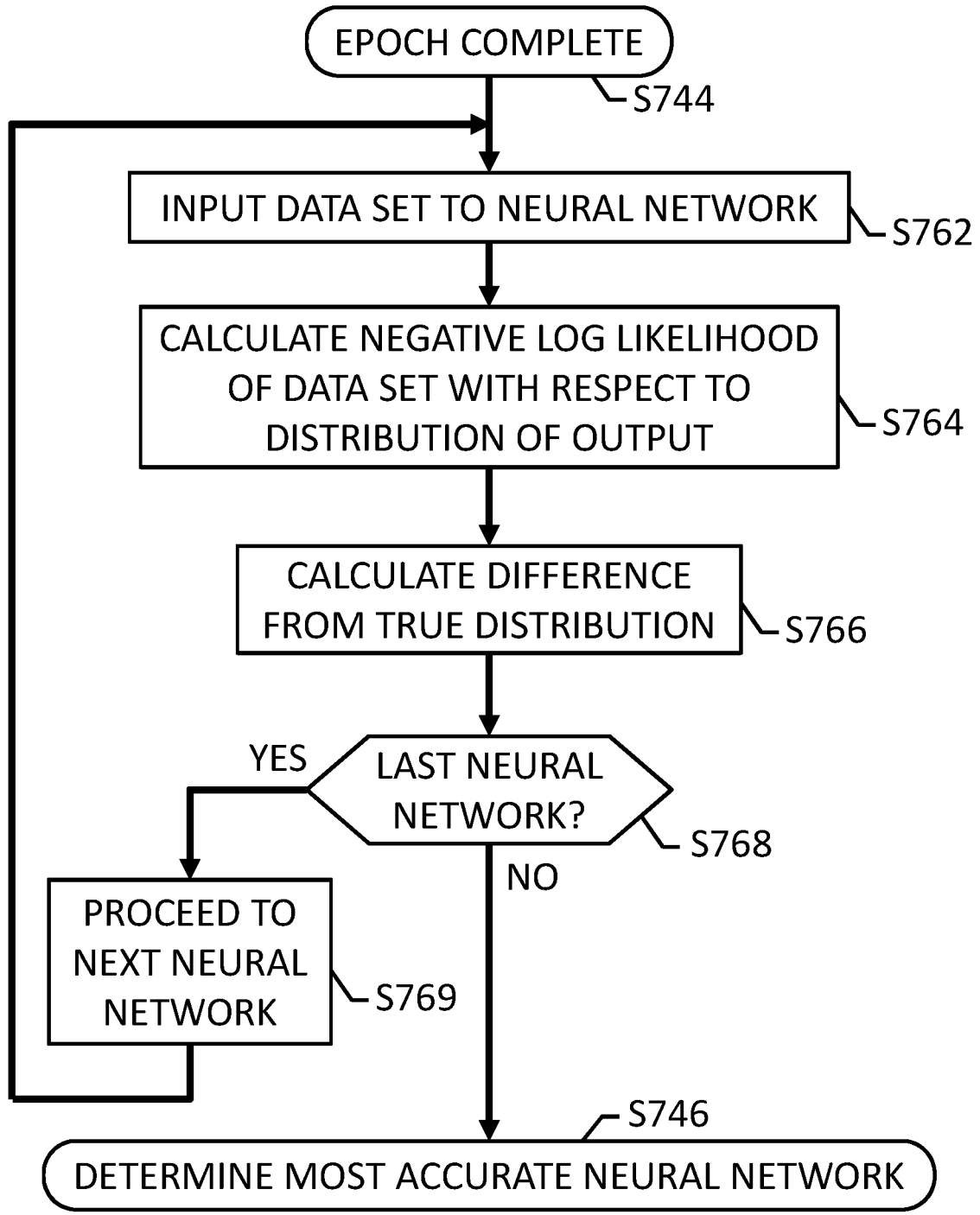
FIG. 7 shows an operational flow for evaluating neural networks, according to an embodiment of the present invention.

FIG. 7 shows an operational flow for evaluating neural networks, according to an embodiment of the present invention. This operational flow can provide each neural network with a value that corresponds to its accuracy. This operational flow can be performed by an evaluating section, such as evaluating section 111.

The operational flow can begin at S744 where an epoch has been completed. At S762, an inputting section, such as inputting section 113, can input a data set to a neural network. In response to the data set being input, the neural network can output a data set. If the neural network is a DyBM, the output data set can include a set of likelihoods of each node (or each node in the input layer) given the previous data of the input data set. At S764, a calculating section, such as calculating section 114, can calculate a negative log likelihood (TNL) of the input data set with respect to a distribution of the output. Also, if unavailable, the calculating section can calculate the negative log likelihood (ONL) with respect to the true distribution of the temporal-pattern from the training sample. In other words, calculating the difference between the output distribution of the neural network and the true distribution of the data set includes calculating the negative log likelihood of the output distribution and the true distribution. At S766, the calculating section can calculate the difference between the ONL and the TNL. For example, the difference between the ONL and the TNL can yield a value to compare with the accuracy of other neural networks. At S768, the evaluating section determines whether there are any neural networks for which a TNL has not yet been calculated. If there are such neural networks, then the operational flow proceeds to S769 where the evaluating section proceeds to consider the next neural network by returning to S762. If the last neural network has been assigned a TNL value, then the operational flow proceeds to S746 to train the neural networks. In other words, the evaluating each neural network among the original neural network and the at least one modified neural network includes inputting a data set into the neural network, and calculating a difference between the output distribution of the neural network and a true distribution of the data set.

In some embodiments, for each training sample and current training cycle, the training section can validate each previously learned neural network for predicting a temporal sequence pattern after a threshold number of training phases have been completed. Then, the calculating section can calculate a negative log-likelihood (TNL) of the training (or validation) data with respect to the distribution defined by the trained DyBM. The calculating section can update the performance evaluation measure by calculating the difference between ONL and TNL, the cross-entropy, or any other appropriate performance measure. A replacing section can update a best model pointer to point towards the learned neural network with the most accuracy so far. Finally, the best performing model (with all parameters fixed) from the training and validation process can be selected for final testing.

The apparatus described above can be especially suitable for learning a generative model of multidimensional temporal pattern sequences. Even in the presence of a relatively small training and test dataset, the apparatus can prevent over-fitting to yield good generalized performance. In a particular application, due to the uniqueness of the structure of DyBM, randomly truncating the length of FIFO queues can lead to changes in the spiking dynamics of the DyBM by shortening the memory of spikes from a pre-synaptic to post-synaptic neuron. Experimental results show that truncating the length of FIFO queues can significantly outperform other state of the art methods, enabling any neural network to yield a greater prediction accuracy, and use less computational resources by reducing the amount of memory required for FIFO queues.

Figure 8:
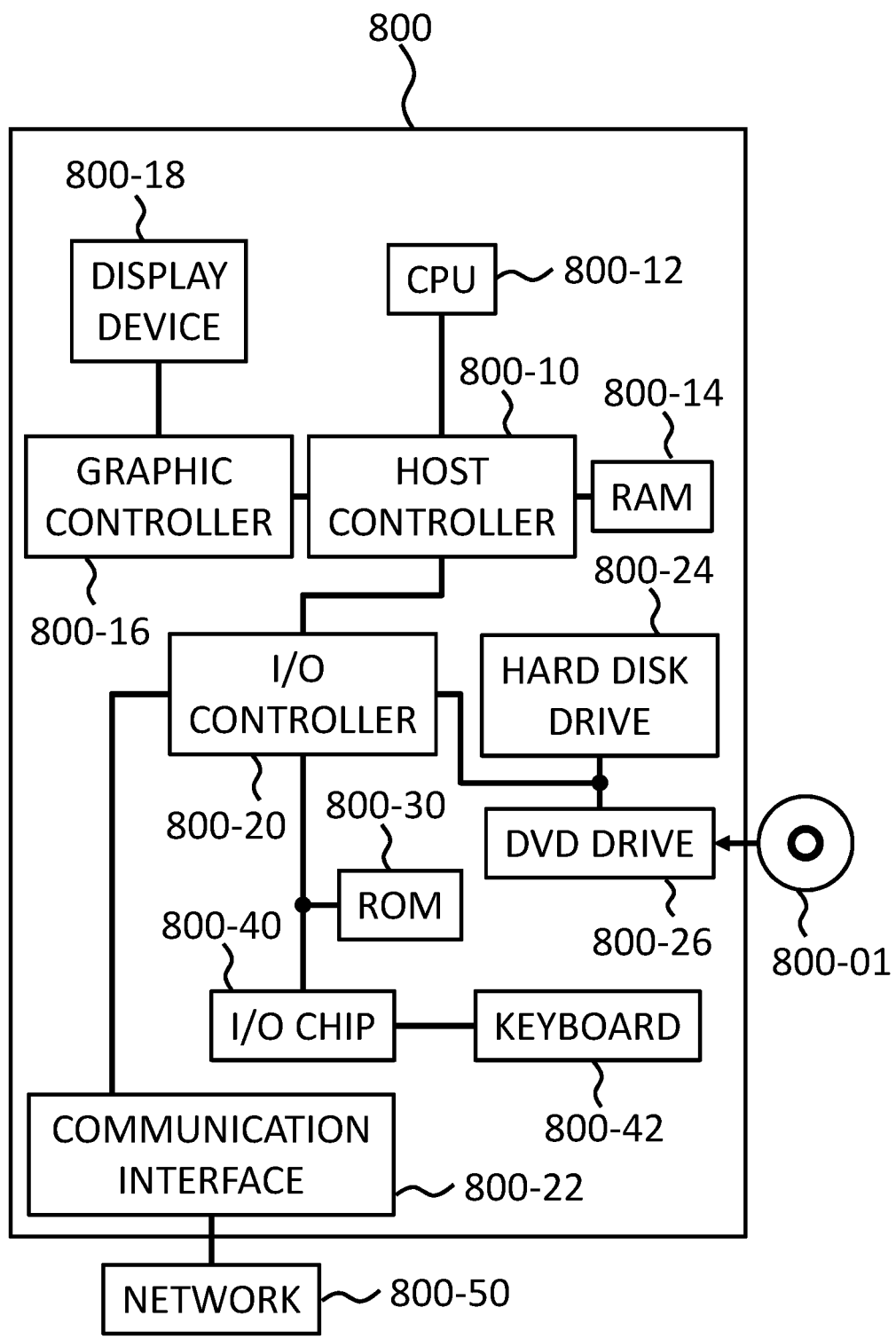
FIG. 8 shows an exemplary hardware configuration of a computer configured for cloud service utilization, according to an embodiment of the present invention.

FIG. 8 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or at least one section (including modules, components, elements, etc.) thereof, and/or cause the computer 800 to perform processes of the embodiments of the present invention or steps thereof. Such a program can be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 can also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method can be constituted by realizing the operation or processing of information in accordance with the usage of the computer 800-

For example, when communication is performed between the computer 800 and an external device, the CPU 800-12 can execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 can cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 can then write back the processed data to the external recording medium.

Various types of information, such as various types of programs, data, tables, and databases, can be stored in the recording medium to undergo information processing. The CPU 800-12 can perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14. In addition, the CPU 800-12 can search for information in a file, a database, etc., in the recording medium. For example, when a plurality of entries, each having an attribute value of a first attribute is associated with an attribute value of a second attribute, are stored in the recording medium, the CPU 800-12 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises at least one executable instruction for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize cloud service utilization.

What is claimed is:

1. A computer-implemented method comprising:
obtaining an original neural network having a plurality of first-in-first-out (FIFO) queues, each FIFO queue located between a pair of nodes among a plurality of nodes of the original neural network;
generating at least one modified neural network, the modified neural network being equivalent to the original neural network with a modified length of at least one FIFO queue, wherein the generating comprises:
selecting the at least one FIFO queue among the plurality of FIFO queues in the original neural network to modify, wherein the selecting is based on a random variable;
truncating the at least one FIFO queue to a designated length, wherein the designated length is greater than zero; and
determining that each of the selected at least one FIFO queues have been truncated to the designated length;
training each neural network among the original neural network and the at least one modified neural network;
evaluating each neural network among the original neural network and the at least one modified neural network; and
determining which neural network among the original neural network and the at least one modified neural network is most accurate, based on the evaluation.

2. The computer-implemented method of claim 1, wherein the original neural network comprises:
a plurality of layers of nodes among the plurality of nodes, each layer sequentially forwarding input values of a time frame of a data set to a subsequent layer among the plurality of layers, the data set being a time series, the plurality of layers of nodes including:
a first layer of input nodes among the plurality of nodes, the input nodes receiving input values of a current time frame of the data set, and
a plurality of intermediate layers, each node in each intermediate layer forwarding a value from a previous layer to a node in a subsequent or shared layer; and
a plurality of weight values corresponding to each FIFO queue, each weight value to be applied to each value in the corresponding FIFO queue to obtain a value propagating from a pre-synaptic node to a post-synaptic node.

3. The computer-implemented method of claim 1, wherein the training includes a training phase for each sample of a data set.

4. The computer-implemented method of claim of claim 3, wherein the data set is a time series, and each training phase corresponds to at least one time frame in the time series.

5. The computer-implemented method of claim 4, wherein the generating includes generating a modified neural network among the at least one modified neural network during each training phase.

6. The computer-implemented method of claim 5, wherein the evaluating and the determining are performed after a threshold amount of training phases.

7. The computer-implemented method of claim 6, further comprising:
replacing the original neural network with the most accurate neural network, wherein once the original neural network has been replaced with the most accurate neural network, subsequent generating, training, evaluating, and determining operations are performed with respect to the most accurate neural network instead of the original neural network.

8. The computer-implemented method of claim 1, wherein the evaluating each neural network among the original neural network and the at least one modified neural network comprises:
inputting a data set into the neural network; and
calculating a difference between the output distribution of the neural network and a true distribution of the data set.

9. The computer-implemented method of claim 8, wherein the calculating the difference between the output distribution of the neural network and the true distribution of the data set includes calculating the negative log likelihood of the output distribution and the true distribution.

10. The computer-implemented method of claim 1, wherein the generating includes selecting at least one FIFO queue among the plurality of FIFO queues in the at least one modified neural network to modify.

11. A non-transitory computer readable storage medium tangibly embodying a computer readable program code having computer readable instructions which, when implemented, cause a computer device to carry out the steps of a method comprising:

obtaining an original neural network having a plurality of first-in-first-out (FIFO) queues, each FIFO queue located between a pair of nodes among a plurality of nodes of the original neural network;
generating at least one modified neural network, the modified neural network being equivalent to the original neural network with a modified length of at least one FIFO queue, wherein the generating comprises:
selecting at the least one FIFO queue among the plurality of FIFO queues in the original neural network to modify, wherein the selecting is based on a random variable;
truncating the at least one FIFO queue to a designated length, wherein the designated length is greater than zero; and
determining that each of the selected at least one FIFO queues have been truncated to the designated length;
training each neural network among the original neural network and the at least one modified neural network;
evaluating each neural network among the original neural network and the at least one modified neural network; and
determining which neural network among the original neural network and the at least one modified neural network is most accurate, based on the evaluation.

12. The computer readable storage medium according to claim 11, wherein the original neural network comprises:
a plurality of layers of nodes among the plurality of nodes, each layer sequentially forwarding input values of a time frame of a data set to a subsequent layer among the plurality of layers, the data set being a time series, the plurality of layers of nodes including:
a first layer of input nodes among the plurality of nodes, the input nodes receiving input values of a current time frame of the data set, and
a plurality of intermediate layers, each node in each intermediate layer forwarding a value from a previous layer to a node in a subsequent or shared layer; and
a plurality of weight values corresponding to each FIFO queue, each weight value to be applied to each value in the corresponding FIFO queue to obtain a value propagating from a pre-synaptic node to a post-synaptic node.

13. The computer readable storage medium according to claim 11, wherein the method further comprises replacing the original neural network with the most accurate neural network.

14. An apparatus comprising:
a memory;
a processor communicatively coupled to the memory; and
a neural network regularization module communicatively coupled to the memory and the processor, wherein the neural network regularization module is configured to perform the steps of a method comprising:
obtaining an original neural network having a plurality of first-in-first-out (FIFO) queues, each FIFO queue located between a pair of nodes among a plurality of nodes of the original neural network;
generating at least one modified neural network, the modified neural network being equivalent to an original neural network with a modified length of at least one FIFO queue, wherein the generating comprises:
selecting the at least one FIFO queue among the plurality of FIFO queues in the original neural network to modify, wherein the selecting is based on a random variable;
truncating the at least one FIFO queue to a designated length, wherein the designated length is greater than zero; and
determining that each of the selected at least one FIFO queues have been truncated to the designated length;
training each neural network among the original neural network and the at least one modified neural network;
evaluating each neural network among the original neural network and the at least one modified neural network;
determining which neural network among the original neural network and the at least one modified neural network is most accurate, based on the evaluation; and
updating a pointer to identify the position of the most accurate neural network.

15. The apparatus of claim 14, wherein the original neural network comprises:
a plurality of layers of nodes among the plurality of nodes, each layer sequentially forwarding input values of a time frame of a data set to a subsequent layer among the plurality of layers, the data set being a time series, the plurality of layers of nodes including
a first layer of input nodes among the plurality of nodes, the input nodes receiving input values of a current time frame of the data set, and
a plurality of intermediate layers, each node in each intermediate layer forwarding a value from a previous layer to a node in a subsequent or shared layer; and
a plurality of weight values corresponding to each FIFO queue, each weight value to be applied to each value in the corresponding FIFO queue to obtain a value propagating from a pre-synaptic node to a post-synaptic node.

16. The computer-implemented method of claim 1, wherein the designated length is determined by decreasing a length of the at least one FIFO queue by subtracting a predetermined size from the length of the at least one FIFO queue unless the length becomes smaller than a minimum size.

17. The computer-implemented method of claim 16, wherein the predetermined size is 1 and the minimum size is 1.

18. The computer-implemented method of claim 1, wherein the random variable defines a likelihood that a particular FIFO queue is going to be truncated.

19. The computer-implemented method of claim 6, wherein the threshold amount of training phases is based on a volatility of a set of weights.

20. The computer-implemented method of claim 1, wherein the designated length is randomly generated.

* * * * *